Patented Oct. 6, 1936

2,056,797

UNITED STATES PATENT OFFICE 2,056,797

CELLULOSE ESTER COMPOSITIONS AND PROCESS OF PREPARING SAME

Maurice L. Macht, Jersey City, and Alan F. Randolph, Montclair, N. J., assignors, by mesne assignments, to E. I. du Pont de Nemours & Company, Wilmington, Del., a corporation of Delaware No Drawing. Application April 26, 1934, Serial No. 722,486

12 Claims. (Cl. 106—40)

This invention relates to cellulose ester compositions and the process of preparing same and, more particularly, to compositions comprising a cellulose ester and a plasticizer therefor, said compositions being in granular form, or readily broken down into granular form, for use in molding operations.

Cellulose ester molding compositions in granular form, as well as other granular form molding compositions, must fulfill certain conditions to be commercially acceptable. The ingredients of the compositions must be thoroughly blended together homogeneously to such a degree that an article subsequently molded from the mixture shall be of uniform composition and texture throughout, and of uniform color, free from aggregates of undispersed coloring material and from spots deficient in color. These compositions must also be in a granular to pulverulent condition to facilitate the handling. Customarily in molding shop practice the charges for the individual molds are made up by passing the granular composition through a preforming or pelleting machine which automatically measures out a predetermined weight of the material and compresses the loose granular material into a hard and durable preform, this preform being much more readily loaded into the die than would be the material in its granular form.

Not only must the molding composition be in granular form but, in order to satisfactorily handle it in the preforming machines, it must not be too voluminous, that is to say, the granular material must have a sufficiently high bulk density, by which term is meant the apparent density of a granular molding compound in an untamped, loose condition, generally expressed in weight per unit volume as, in the mixed term, grams per cubic inch. The granular material must be in such condition as to feed readily by gravity from the hopper to the cavity of the pelleting machine and must not contain an undue proportion of fines which tend to cause the jamming of the plunger in the cavity of the pelleting machine by building up in the narrow clearance provided between them. Moreover, the granular material must not contain any individual particles of comparatively large size, as then the operation of the pelleting machine will be defective in that the automatic device which levels off the individual charge of material in the cavity will not accurately level material containing very coarse particles.

Heretofore various methods have been proposed for the preparation of molding compositions of a base of cellulose ester having in general the properties outlined above but all of these methods suffer very material disadvantages of one sort or another, either as to the difficulty and expense of manufacture or as regards the quality of the products made.

Thus, for example, the manufacture of molding compositions by simple ball-mill grinding is, in general, limited to low plasticizer contents and yields a compound of poor bulk density. Manufacture by mixing and/or rolling to form a continuous colloidal mass which is subsequently ground, a procedure heretofore proposed, involves high labor cost and usually the cost of unrecovered volatile solvent and furthermore subjects the material unduly long to the deleterious effects of heat. Manufacture of molding compositions by precipitation of a powder from a dough or thin colloid involves the expense of volatile solvent and, in some cases, the uncontrolled loss of nonvolatile solvent and is difficult to control as regards particle size. The manufacture of cellulose ester molding compositions by agitation of the cellulose ester in suspension as proposed in British patent 351,390 results either in lack of homogeneity or in poor bulk density and is also subject to limitations as regards choice of plasticizers and coloring ingredients. None of the methods heretofore proposed for the preparation of these molding compositions has been free of material drawbacks.

An object of the present invention is to provide a simple and economical process of producing cellulose ester compositions in novel form particularly adapted for use in molding. A further object is to provide such a process which is extremely flexible as to compositions employed, and further, is free from the drawbacks discussed above in connection with the prior art processes. A further object is to provide a novel form of cellulose ester compositions for molding purposes and other uses. Other objects of the invention will be apparent from the description given hereinafter.

The above objects are accomplished according to the present invention by kneading a mixture comprising a cellulose ester and a plasticizer therefor and stopping said kneading when said mixture is formed into a substantially homogeneous, cellulous, friable mass which is more or less spongy and non-transparent. The mass is characterized by being readily friable even when still hot from the kneading operation and it is in a state of incipient or semi-colloidalization as compared to the familiar fully colloided tough, horny cellulose ester compositions which are characterized by not being friable when warm, if friable at all, and which are continuous in physical structure and transparent in thin films in the absence of fillers or insoluble pigments. The mass produced according to this invention, besides obviously not being fully colloided throughout, is distinctly cellulous, that is, it contains innumerable small cells or cavities. Despite this characteristic cellulous structure, the mass is well compacted and when broken down into granular form has satisfactorily high bulk density.

In a preferred form the invention comprises kneading in a masticator mixer under positive pressure a mixture comprising a cellulose ester, preferably cellulose acetate, a plasticizer therefor and coloring matter, while maintaining the mixture at a temperature less than about 85° C., until the mixture is formed into a substantially homogeneous, friable, cellulous mass, removing said mass from the mixer and breaking it down to granular form without necessarily allowing it to cool.

Masticator mixers are well known in the art, the "Banbury" mixer being a prominent example. In these masticator mixers the masticating action is largely produced by having a very small clearance between the blades of the mixer and the adjacent wall and forcing the material being mixed down into the small clearances by means of a pressure ram. The term "under positive pressure" is used herein in its customary sense in this art, namely that a pressure ram, or equivalent device, is forcing the mixture down into the clearances between the blades of the mixer and the adjacent wall whereby an exceptionally strenuous masticating action is effected.

In carrying out the process, ordinarily the mixture introduced into the masticator mixer and the mixer itself are at normal temperatures but the temperature of the mixture, due to friction, immediately begins to rise when the mixer is set in motion. Ordinarily the temperature of the mixture will not rise to 85° C. by the time it is formed in the homogeneous mass above described and it is preferred that the temperature should not be allowed to materially exceed 85° C. and, in no event, should the masticating action be continued to any appreciable extent after the homogeneous, cellulous mass is formed, as otherwise it will quickly be changed further into the familiar fully colloided horny mass which is to be avoided according to the present invention.

The following examples are given in order to illustrate specific embodiments of the present invention, parts being given by weight:—

Example 1.—A preliminary mixture was made of the following ingredients:

| | Parts |
|---|---|
| Cellulose acetate | 75 |
| Dimethoxyethyl phthalate | 25 |
| Titanium oxide | 0.004 |

This preliminary mixture was introduced into a masticator mixer, such as the "Banbury" mixer, in sufficient quantity to fill the mixer to such a point that the pressure ram of the mixer will operate to produce a positive pressure upon the contents of the mixer during mastication. The mixer was set in motion with the pressure ram in operating position to exert a pressure of 10–50 pounds per square inch on the mass within the mixer and the mixing was continued until a homogeneous, cellulous, friable mass was formed. This mass appeared somewhat spongy and was found to be friable even when warm. The point at which the mixer should be stopped could be conveniently recognized by the squealing of the mixer and the rising of the ram. During the course of the mixing it was found that the mass was heated by internal friction to a temperature of about 82° C.

The cellulous, friable mass was removed from the mixer and broken down into a granular powder by passing through a rotary grinder. There then resulted a granular powder well adapted for molding which had a bulk density of 7.0 grams per cubic inch and a screen analysis as follows:

Screen analysis

| | | Percent |
|---|---|---|
| On | 10-mesh | 16 |
| | 30-mesh | 58 |
| | 40-mesh | 14 |
| | 60-mesh | 5 |
| | 80-mesh | 3 |
| | 100-mesh | 2 |
| Through | 100-mesh | 2 |

This material pelleted satisfactorily in a standard pelleting machine and when molded in a heated die under pressure yielded a molded article which was uniform in appearance and strength.

Example 2.—A similar procedure was followed with the following mixture:

| | Parts |
|---|---|
| Cellulose acetate | 75 |
| Dimethyl phthalate | 25 |
| Titanium oxide | 0.053 |
| Madder lake | 0.021 |
| Alizarine purple lake | 0.001 |

It was found that in this composition the temperature of the mass at the time it reached the homogeneous, cellulous condition was 65–70° C. The mass upon removal from the mixer was readily disintegrated to granular form.

Example 3.—A similar procedure was carried out with the following mixture:

| | Parts |
|---|---|
| Cellulose acetate | 75 |
| *Paratoluene sulphonamide | 25 |
| Titanium oxide | 0.11 |
| Cadmium yellow | 0.07 |

*Melting point 130–135° C.

The temperature of the mass was 80° C. when the desired homogeneous, cellulous, friable condition was reached.

Example 4.—A procedure similar to Example 1 was carried out with the following mixture:

| | Parts |
|---|---|
| Cellulose acetate | 75 |
| Dimethoxyethyl phthalate | 25 |
| Ethyl alcohol | 2 |
| Hydrated chromium oxide | 0.006 |

The temperature of the mass was 67° C. when the desired homogeneous, cellulous, friable condition of the material was reached.

Example 5.—A similar procedure was carried out with the following mixture:

| | Parts |
|---|---|
| Cellulose acetate | 75 |
| Dimethoxyethyl phthalate | 25 |
| Water | 2 |
| National fast acid blue | 0.001 |

The desired cellulous condition was reached at a temperature of 75° C. The cellulous mass was then disintegrated to a granular form.

*Example 6.*—A similar procedure was carried out with the following mixture:

| | Parts |
|---|---|
| Cellulose acetate | 75 |
| Dimethoxyethyl phthalate | 25 |
| Methylcellosolve | 2 |
| National fast acid blue | 0.002 |

The desired cellulous condition was reached at a temperature of 70° C.

The following examples illustrate further compositions suitable for use in the present process:—

*Example 7*

| | Parts |
|---|---|
| Cellulose acetate | 78 |
| Dimethoxyethyl phthalate | 18 |
| Triphenyl phosphate | 4 |
| Rhodamine BX | 0.002 |

*Example 8*

| | Parts |
|---|---|
| Cellulose acetate | 100 |
| Dimethyl phthalate | 40 |
| China clay | 100 |
| Titanium oxide | 8 |
| Cadmium yellow | 2 |

*Example 9*

| | Parts |
|---|---|
| Cellulose acetate | 85 |
| Dimethyl phthalate | 15 |
| Hydrated chromium oxide | 0.01 |
| Cadmium yellow | 0.01 |

*Example 10*

| | Parts |
|---|---|
| Cellulose acetate | 70 |
| Dimethoxyethyl phthalate | 30 |
| Cadmium red | 0.02 |

It is to be understood that the above examples are merely illustrative and that the invention is broadly applicable to mixtures of cellulose esters and plasticizers with or without additional ingredients such as coloring matter, which is almost invariably included, and the various special effect materials such as bronze powders, pearl essence, and the like, fillers, among which may be mentioned asbestos, terra alba, clay, gypsum, and vegetable fibers, lubricants such as waxes and metallic soaps, resins, and other auxiliary ingredients. The cellulose acetate in the examples may be replaced in part or in whole by other cellulose esters such as cellulose formate, cellulose propionate, or cellulose nitrate.

The choice of plasticizer to be employed with the cellulose ester is extremely wide and will be selected primarily for the characteristics desired in the finished molding powder rather than with any regard to the processing according to the present invention. Plasticizers other than those disclosed in the specific examples which are satisfactory for use in the present invention include the following:—

Triacetine
Tripropionine
Ethylparatoluenesulphonamide
Methylphthalyl ethylglycollate
Methyl acetanilide
Ethyl acetanilide
Dibutyl tartrate
Dimethoxyethyl adipate
Dimethoxyethyl benzoylbenzoate
Xylene monomethylsulphonamide
Diglyceryl tetracetate
Diethyl phthalate
Chlorinated naphthalenes
Tributyl phosphate
Tricresyl phosphate The proportion of the various ingredients in the mixture to be processed will be determined likewise primarily to establish the desired properties in the finished molding powder. It has been found that in molding powders it is preferable to use plasticizer in the proportion of 15–30% of the combined weight of cellulose acetate and plasticizer, although this may fluctuate for particular desired effects from 5–100 parts of plasticizer per 100 parts of cellulose acetate. It will be understood by those skilled in this art that the present invention is not primarily directed to specific molding compositions but rather to a process of treating organic cellulose ester compositions for molding, and the like, in general and to a novel form of organic cellulose ester molding compositions. The specific plasticizer used with the organic cellulose ester and the proportions thereof will ordinarily be determined by the characteristics desired in the finishing molding powder and the present invention is broadly applicable to all such compositions.

To practice the present invention the mixture of cellulose ester and plasticizer must be formed into a substantially homogeneous, cellulous, friable mass but the further change into the ordinary, tough, horny, fully colloided mass must be avoided. If a mixture of cellulose ester and plasticizer is kneaded indefinitely, it will ultimately become fully colloided and it has been found that this action with most plasticizers takes place with great rapidity at a temperature of 90° C., or even slightly below. On the other hand, if the mixture is maintained at a temperature below 86° C., the change from the cellulous, friable state to the fully colloided state does not take place so rapidly that there is any difficulty in stopping the kneading in time. Moreover, working with a large number of plasticizers, it has been found that it is not necessary in any case to exceed a temperature of 85° C. to form the desired homogeneous, cellulous, friable mass in a relatively short period of kneading, usually from 1 to 5 minutes. Therefore, it is preferred not to allow the temperature of the mixture to exceed 86° C. so that any difficulty in stopping the kneading action at the proper time may be avoided. However, the critical feature of the process is that the kneading action be stopped when the mixture is formed into a homogeneous, cellulous, friable mass and before it is converted into a tough, fully colloided mass, not the temperature of the mixture during kneading; in some instances where a particularly inactive plasticizer is used, or a small proportion of plasticizer is used, or where the operator is particularly skillful, it may be desirable to allow the temperature of the mixture to substantially exceed 86° C. On the other hand, particularly where large amounts of very active plasticizers are used, the mixture may be formed into the desired state before the temperature of the mixture has risen much in excess of room temperature.

Those skilled in the art will appreciate that the optimum temperature at which any particular mixture is formed into the desired homogeneous, cellulous, friable state at sufficient speed for economical operation but not such great speed as to be uncontrollable and which temperature it is not desirable to exceed, will be influenced not only by the amount and properties of the particular plasticizer employed but also, among other things, on the particular qualities of the cellulose ester used. For example, where commercial flake cellulose acetate is employed, the solubility of the particular flake in the plasticizer, the viscosity characteristic of the flake, the acetyl number of the flake (in so far as it is responsible for solubility and viscosity), the physical condition and moisture content of the flake, will all play some part in determining the temperature above which it is not desirable to work.

Where the cellulose ester mixture and the mixer are at room temperature at the start, it has been found that positive cooling means are usually not required. The mixture does heat up due to internal friction but the short time required to form the homogeneous, cellulous, friable mass does not permit the temperature of the mixer to reach 85° C. as a rule and, in some instances, the temperature of the mixture only rises to 50°C. by the end of the kneading operation. Where successive batches are being run through the mixer without allowing the mixer to cool, it may heat up to a point where the temperature of the mixture has a tendency to rise about 85° C. before the ingredients are homogeneously mixed, in which event positive cooling means would preferably be employed. Positive heating means are unnecessary as the internal friction due to the kneading automatically supplies the heat necessary.

While it is preferred to employ a masticator mixer to knead the mixture, the invention is by no means limited to the use of this particular mixer, as any apparatus which will give a severe kneading action may be employed, such as a screw stuffer. Since no volatile solvent is necessarily used, the mixer may be open to the atmosphere, although this is not preferred. A masticator mixer is preferred because it gives such a severe and thorough homogenizing and kneading action. This type of mixer employs a pressure ram to keep the material being kneaded under a positive pressure, thereby forcing the material into the small clearances between the blades and the adjacent walls of the mixer. In the specific examples a pressure of 10-50 pounds per square inch was used on the ram but the particular pressure is not in any way critical. Various mixers may be designed to operate under different pressures and the particular pressure is incidental as long as some positive pressure is exerted on the material to force it down into the small clearances and check the tendency of the material to merely ride around with the blades and avoid any kneading action at all.

The homogeneous, cellulous, friable mass may be immediately broken down into granular form upon removal from the mixer without waiting for the mass to cool. The reason for this is that, in contradistinction to the ordinary continuous tough, horny masses heretofore produced, the cellulous, friable mass obtained according to the present invention possesses a considerable degree of friability even at temperatures as high as 85° C. and therefore it is quite feasible that the mass be ground immediately upon its discharge in hot condition from the mixer. Any suitable means may be used for reducing the mass to granular form, such as a hammer mill, a rotary mill, a three-roll mill, and equivalent grinding mechanisms.

In the specific examples the cellulose acetate was employed in the ordinary commercial form of soft, porous "flake" containing hygroscopic moisture which usually amounts to from 2-6% of its weight. As will be apparent to those skilled in the art, the invention is applicable to organic cellulose esters in any of the ordinary forms in which these esters are found in the market. Nevertheless, in order that the mixture may be worked satisfactorily the cellulose ester should be comminuted, and preferably quite finely divided, at the time it is introduced into the kneading apparatus, or it should be in such form that it will be readily broken down into comminuted form as the kneading apparatus is set in motion.

No special provision was made for preliminary preparation of the coloring ingredients in the procedure given in the specific examples and it has been found that with most molding compositions, the majority of the pigment colors, if merely added dry in making the preliminary mixture to be introduced into the kneading apparatus, will become uniformly dispersed throughout the mass within the time devoted to kneading. Certain pigment colors are more refractory in this respect, tending to resist dispersion by the kneading action and to remain in agglomerated form, distributed throughout the mass so as to produce a non-uniform or speckled appearance. When dealing with such pigments, or, for example, when dealing with a molding composition which is so readily kneaded to the homogeneous, cellulous, friable state as to allow insufficient time for the dispersion of the coloring ingredient, it has been found desirable to subject the coloring ingredients to a preliminary treatment to promote their dispersion, such as grinding them in a ball mill either alone or with all or a portion of one of the other ingredients of the mixture to be introduced into the kneading apparatus.

The homogeneous, cellulous, friable mass obtained according to the present invention may be used for other purposes than the preparation of a molding compound. For example, it may be subjected, either with or without an intermediate grinding operation, to known plastics processes such as rolling, cake pressing, extrusion, dope making, and the like.

Among the advantages of the present invention is that it eliminates the use of volatile solvents whereby expense through loss of solvent and cost of recovering solvent are eliminated. The present invention is carried out at a moderate temperature and thus avoids the disadvantages of operation at high temperature, chief of which is the deleterious effect of exposure to high temperature upon many of the otherwise desirable coloring ingredients and upon the cellulose ester itself. Also the kneading operation is carried out for such a short period of time that it further minimizes the danger of exposure of the composition to heat. The shortness of the processing cycle is, of course, advantageous in making possible a large production per day per unit and a decreased labor cost. A further advantage of the present invention is that the homogeneous, cellulous, friable mass is inherently friable even when warm which makes it much more readily reduced to granular form even when immediately withdrawn from the mixer than the tough, horny, fully colloided masses heretofore produced. When operating according to the present invention the homogeneous, cellulous, friable mass may be ground immediately upon its discharge from the mixer while still hot, whereas in the heretofore known procedures, in which the cellulose ester is formed into the fully colloided, tough, horny mass, an intermediate cooling is necessary prior to granulation. In fact, the fully colloided mass is so difficult to break down into granular form, it has been proposed to use carbon dioxide snow to chill it to a point where it possesses a reasonable degree of friability. Other advantages of the present invention are that, upon granulation of the friable mass, a granular material of high bulk density is obtained, and furthermore, a molding powder is obtained which is exceptionally free from contamination which would cause haze, discoloration, or dirt.

As many apparently widely different embodiments of this invention may be made without departing from the spirit and scope thereof, it is to be understood that the invention is not limited to the specific embodiments thereof except as defined in the appended claims.

We claim:

1. Process of preparing cellulose ester compositions comprising kneading a mixture comprising a cellulose ester and a plasticizer therefor, and stopping said kneading when said mixture is formed into a substantially homogeneous, cellulous, friable mass.

2. Process of preparing cellulose ester compositions comprising kneading under positive pressure a mixture comprising a cellulose ester and a plasticizer therefor, and stopping said kneading when said mixture is formed into a substantially homogeneous cellulous, friable mass.

3. Process of preparing cellulose acetate compositions comprising kneading a mixture comprising cellulose acetate and a plasticizer therefor, and stopping said kneading when said mixture is formed into a substantially homogeneous, cellulous, friable mass.

4. Process of preparing cellulose acetate compositions comprising kneading under positive pressure a mixture comprising cellulose acetate and a plasticizer therefor, and stopping said kneading when said mixture is formed into a substantially homogeneous, cellulous, friable mass.

5. Process of preparing cellulose ester molding powders which comprises kneading a mixture comprising a cellulose ester and a plasticizer therefor, stopping said kneading when said mixture is formed into a substantially homogeneous, cellulous, friable mass, and then breaking down said mass into granular form.

6. Process of preparing cellulose acetate molding powders which comprises kneading a mixture comprising cellulose acetate and a plasticizer therefor, stopping said kneading when said mixture is formed into a substantially homogeneous, cellulous, friable mass, and then breaking down said mass into granular form.

7. Process of preparing cellulose ester molding powders which comprises kneading in a masticator mixer under positive pressure a mixture comprising a cellulose ester and a plasticizer therefor, stopping said kneading when said mixture is formed into a substantially homogeneous, cellulous, friable mass, and then breaking down said mass into granular form.

8. Process of preparing cellulose acetate molding powders which comprises kneading in a masticator mixer under positive pressure a mixture comprising cellulose acetate and a plasticizer therefor, stopping said kneading when said mixture is formed into a substantially homogeneous, cellulous, friable mass, and then breaking down said mass into granular form.

9. Process of preparing cellulose acetate molding powders which comprises kneading in a masticator mixer under positive pressure a mixture comprising 100 parts cellulose acetate and 5–100 parts of a plasticizer therefor, while maintaining the temperature of said mixture below 86° C., stopping said kneading when said mixture is formed into a substantially homogeneous, cellulous, friable mass, and then breaking down said mass into granular form.

10. Process of preparing cellulose acetate molding powders which comprises kneading in a masticator mixer under positive pressure a mixture comprising 100 parts of cellulose acetate, 15–30 parts of a plasticizer therefor, and coloring matter, while maintaining the temperature of said mixture below 86° C., stopping said kneading when said mixture is formed into a substantially homogeneous, cellulous, friable mass, removing said mass from the mixer, and breaking down to granular form.

11. Product comprising cellulose acetate and a pasticizer therefor, said product being substantially homogeneous, cellulous, and friable at temperatures above room temperature and adapted to be granulated to give a molding compound having a bulk density of about 7.0 grams per cubic inch at a screen analysis of:

|  | Percent |
|---|---|
| On 10-mesh | 16 |
| 30-mesh | 58 |
| 40-mesh | 14 |
| 60-mesh | 5 |
| 80-mesh | 3 |
| 100-mesh | 2 |
| Through 100-mesh | 2 |

12. Product comprising cellulose acetate, a plasticizer therefor in the proportion of 15–30% of the combined weight of cellulose acetate and plasticizer, and coloring matter, said product being substantially homogeneous, cellulous, and friable at temperatures up to 85° C. and adapted to be granulated to give a molding compound having a bulk density of about 7.0 grams per cubic inch at a screen analysis of:

|  | Percent |
|---|---|
| On 10-mesh | 16 |
| 30-mesh | 58 |
| 40-mesh | 14 |
| 60-mesh | 5 |
| 80-mesh | 3 |
| 100-mesh | 2 |
| Through 100-mesh | 2 |

MAURICE L. MACHT.
ALAN F. RANDOLPH.